(12) United States Patent
White et al.

(10) Patent No.: US 11,330,435 B2
(45) Date of Patent: *May 10, 2022

(54) DISTRIBUTED LEDGER SYSTEMS FOR AUTHENTICATING LTE COMMUNICATIONS

(71) Applicant: NOBLIS, INC., Reston, VA (US)

(72) Inventors: David White, Centreville, VA (US); Christopher Dabo, Woodbridge, VA (US)

(73) Assignee: NOBLIS, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/065,921

(22) Filed: Oct. 8, 2020

(65) Prior Publication Data

US 2021/0037383 A1 Feb. 4, 2021

Related U.S. Application Data

(63) Continuation of application No. 16/819,768, filed on Mar. 16, 2020, now Pat. No. 10,856,150.

(60) Provisional application No. 62/822,257, filed on Mar. 22, 2019.

(51) Int. Cl.
*H04W 12/06* (2021.01)
*G06F 16/23* (2019.01)
*H04L 9/06* (2006.01)
*H04W 92/10* (2009.01)

(52) U.S. Cl.
CPC ........ *H04W 12/06* (2013.01); *G06F 16/2365* (2019.01); *H04L 9/0637* (2013.01); *H04L 2209/38* (2013.01); *H04W 92/10* (2013.01)

(58) Field of Classification Search
CPC ... H04W 12/06; H04W 92/10; G06F 16/2365; H04L 9/0637; H04L 2209/38; H04L 2209/80; H04L 9/3239
See application file for complete search history.

(56) References Cited

U.S. PATENT DOCUMENTS

| | | | |
|---|---|---|---|
| 10,181,948 B1 | 1/2019 | Nenov et al. | |
| 10,856,150 B2 * | 12/2020 | White | H04W 12/06 |
| 2019/0380031 A1 * | 12/2019 | Suthar | H04L 41/0896 |
| 2020/0029250 A1 | 1/2020 | Ibek et al. | |
| 2020/0213857 A1 | 7/2020 | Obaidi | |
| 2020/0221299 A1 * | 7/2020 | Suthar | H04W 12/041 |

* cited by examiner

*Primary Examiner* — Marisol Figueroa
(74) *Attorney, Agent, or Firm* — Morrison & Foerster LLP

(57) ABSTRACT

Techniques for authenticating a mobile user device at a base station of a mobile network, and more specifically for implementing a distributed ledger based authentication that is shared by multiple base stations of the mobile network is provided. In one or more examples, the base stations of a mobile network can act as nodes in a distributed ledger system. A mobile device seeking to gain access to the mobile network can be provided a distributed ledger identification number by a base station. The distributed ledger identification number can be converted to a block of the distributed ledger, and then transmitted to the other base stations (i.e., nodes) that maintain the same distributed ledger. The mobile device can subsequently use the distributed ledger identification number for future access requests at either the same base station, or any of the other base stations that maintain the same distributed ledger.

24 Claims, 8 Drawing Sheets

DISTRIBUTED LEDGER SYSTEMS FOR AUTHENTICATING LTE COMMUNICATIONS

CROSS-REFERENCE TO RELATED APPLICATIONS

This application is a continuation of U.S. application Ser. No. 16/819,768, filed Mar. 16, 2020, which claims the benefit of U.S. Provisional Application No. 62/822,257, filed on Mar. 22, 2019, the entire contents of each of which are incorporated herein by reference and for all purposes.

FIELD

This disclosure relates generally to systems and methods for authenticating communications between a user mobile device and a communications network, and more specifically, to edge node authentication of a mobile communications network through the use of a distributed ledger-based system.

BACKGROUND

Mobile communications, in which a mobile end user device can transmit and receive messages to and from other mobile or computing devices can provide a fast and convenient platform for users to access information in any location without requiring a device that is hard-wired or plugged-in to a communications network to facilitate that communication. In order to facilitate such communications, mobile devices often need the ability to access vast and robust communication networks that can send communications to and receive communications from a mobile user device and route those communications to their intended destination.

Cellular communications have often been used to enable mobile communications. Cellular communication schemes employ a communications network in which the last link (i.e., the link between the network and a mobile device) is wireless, therefore allowing the mobile device to move freely about in a given geographic area while still employing the ability to transmit and receive communications between the network and the mobile device. In a typical cellular network, a mobile device is able to transmit and receive data wirelessly to and from a base station. The base station then is able to relay data to and from a mobile device to a larger communications network that is also connected to the cellular communications network. Many different cellular communication schemes have been employed to facilitate mobile communications such as Global System for Mobile Communications (GSM), Code Division Multiple Access (CDMA) and General Packet Radio Service (GPRS).

Recently, Long-Term Evolution (LTE), a high-speed wireless communication protocol has greatly enhanced the capabilities of mobile devices to communicate to other mobile devices or access the internet with greater speed and capacity. Like other cellular networks, mobile devices that utilize an LTE communications protocol communicate wirelessly with a base station, which can relay messages to and from the mobile user device to other base stations or to other wired computing devices.

Currently, LTE is the largest standard and serves billions of devices all over the world. As cellular networks such as LTE grow and new devices attach to these networks, their susceptibility to actions from malicious users increases. The term "malicious user" can refer to individuals or entities whose aim is to hinder or prevent communications in a cellular network from taking place. For instance, a malicious user can attempt to compromise the network and make it fail, thereby affecting the ability of a vast number of people utilizing the network to communicate with one another.

While cellular networks like LTE often employ schemes to authenticate a user's identity, and only permit authenticated users access to the cellular network, to date the focus of these authentication schemes has been focused on the communications between a base station and other elements within the cellular network. However, to date, there has been a lack of efficient and effective schemes to broker a mobile device's access to the edges of the cellular network. The edge of a cellular network can refer to the base station that is often the first element in the communications network that a mobile device interfaces with to initiate communications with the broader network. While authentication protocols exist to ensure authorized user access to the broader network, current authentication schemes are not configured to broker a mobile device's access to the edge of the network (i.e., the base station).

SUMMARY

Presented herein are systems and methods for providing edge authentication to a cellular network. In one or more examples, the cellular network can use a distributed ledger (i.e., blockchain) based approach to authenticating a user mobile device so as to grant the device access to the mobile base station located at the edge of the network. In one or more examples, the blockchain can be held as a distributed ledger between cell towers in a geographic region. The towers (also known as eNodeBs or eNBs in the LTE context) can be authorized as members of the blockchain from the core network of the LTE system and can be configured to process the blockchain transactions.

In one or more examples, the blockchain can store temporary IDs as Registered Blockchain IDs (RBIDs, also referred to as "blockchain IDs") in the blockchain. The RBIDs can be used to perform authentication of the mobile device at the base station. In one or more examples, before a new mobile device can receive an RBID from the base station, the mobile device may need to perform an initial attach procedure so as to verify that it has the proper credentials to access the network.

In one or more examples, once the attachment procedure is completed, and the authentication and authorization of the mobile device are completed, the core network can issue an RBID for the user mobile device to use. The RBID can be then associated with the mobile device and can be sent to a group of eNB (that make up the network) to be added to the blockchain as a valid temporary ID.

DETAILED DESCRIPTION

Figure 1:
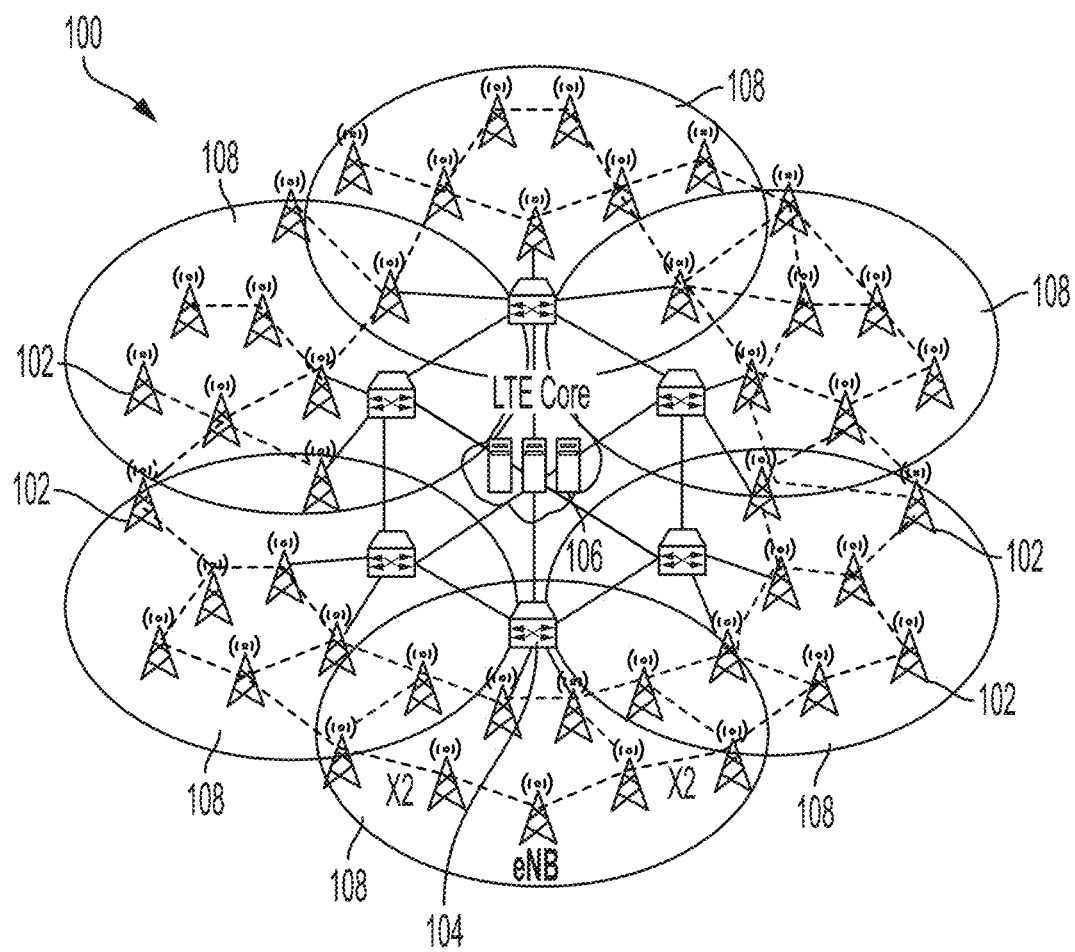
FIG. 1 illustrates an exemplary mobile communications network according to some examples of the disclosure.

The following description sets forth exemplary methods, parameters, and the like. It should be recognized, however, that such description is not intended as a limitation on the scope of the present disclosure but is instead provided as a description of exemplary embodiments.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses any and all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and, when embodied in software, they could be downloaded to reside on, and be operated from, different platforms used by a variety of operating systems.

The present invention also relates to a device for performing the operations herein. This device may be specially constructed for the required purposes or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention, as described herein.

As explained above, there is a need for authentication of user mobile devices at the edges of a cellular network that can effectively prevent malicious user access to the cellular network while at the same time minimizing the amount of overhead required to perform the authentication.

The systems, methods, and techniques disclosed herein may address this need by providing an authentication platform at the edge of a node that can robustly and quickly verify the authenticity of a user mobile device by taking advantage of the network security features that are inherent in distributed ledger technologies such as blockchain. By performing verification at the edge of the network, the systems and methods described herein can prevent the core network of a cellular communications system from being compromised by malicious user attacks.

FIG. 1 illustrates an exemplary mobile communications network according to some examples of the disclosure. The cellular network 100 of FIG. 1 can include one or more base stations 102. In one or more examples, a base station can refer to a land-based wireless communications station that is installed at a fixed location and can be configured to relay communications from a mobile user device to a larger communications network. In one or more examples, the base stations 102 can also be configured to relay data and messages from the larger communications network to the user mobile device. Whereas the user mobile device (not pictured) is able to move about, base stations 102 can be fixed at a specific location.

In one or more examples, and in the context of cellular communications, when a mobile user device wishes to access a communications network, the device can search for a base station 102 that it is closest to and establish a communications link between itself and the base station. The base station 102 can then relay the user mobile device's message to other base stations 102 or to a router 104. The router 104 can route communications to the core 106 of the network, wherein the message can be processed and sent to the appropriate router 104 and base station 102 so as to reach its intended destination.

The system described above with respect to FIG. 1 can be susceptible to attack from a malicious user wishing to interfere with an individual user's mobile communications, or the communications of the network at large. Because an interference or failure of the network at large in a mobile communications network can impact many users simultaneously, mobile networks are generally equipped with security to prevent unauthorized access to the network at large. In this way, by denying unauthorized users access to the network at large, a malicious user may not be able to wreak havoc on the network at large, thus preventing an entire mobile network from failing or becoming unusable to each individual mobile user.

One security mechanism that can be employed by the network is an authentication procedure that requires each individual user to authenticate themselves before receiving access to the core of the network. In one or more examples, while a user can still access a base station, when the user's messages are being passed to the core of the network, the network can require that the user authenticate their identity before allowing that user's messages from being passed through the network.

Figure 2:
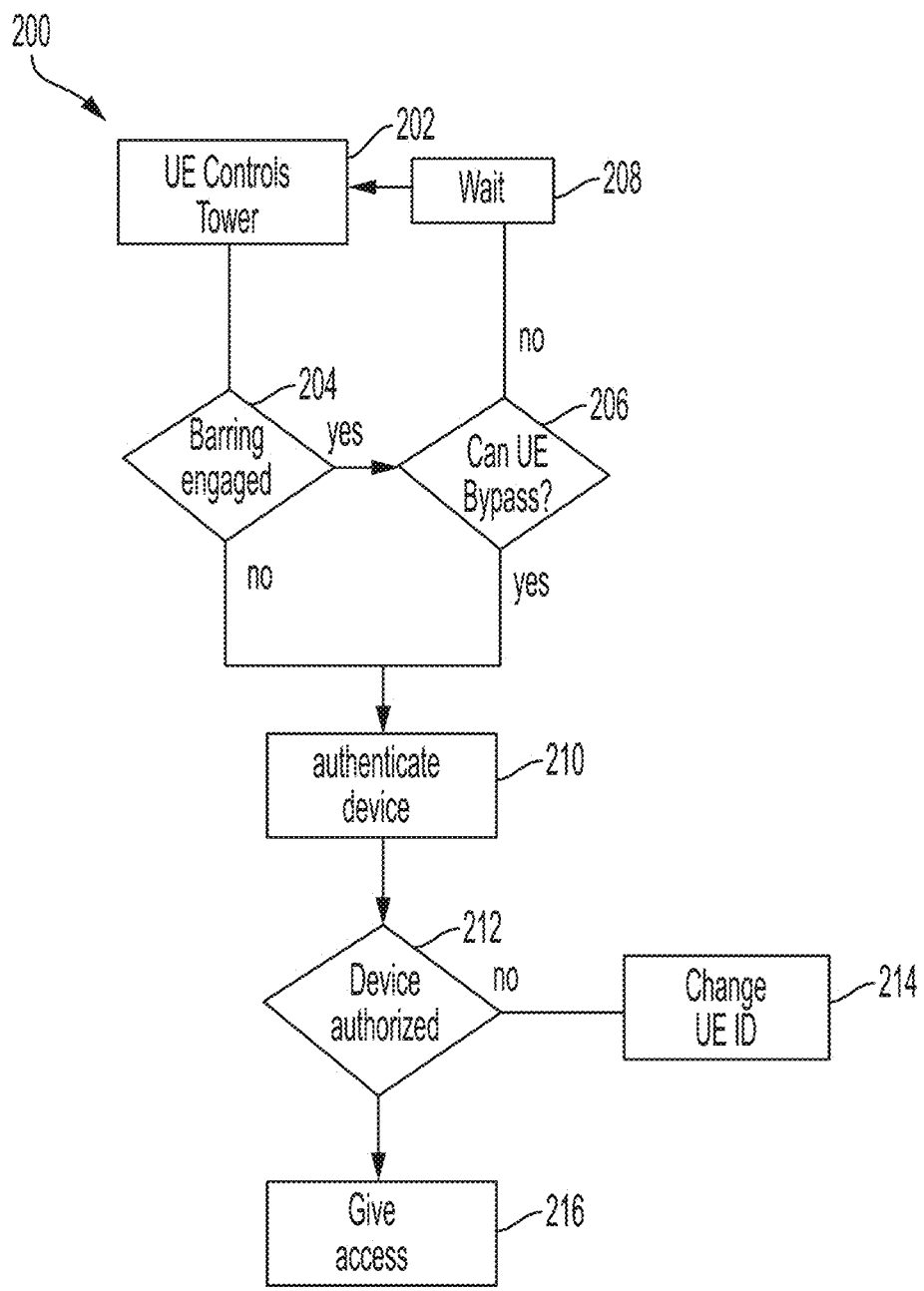
FIG. 2 illustrates an exemplary mobile communication authentication process according to examples of the disclosure.

FIG. 2 illustrates an exemplary mobile communication authentication process according to examples of the disclosure. The process 200 can begin at step 202, wherein a user equipment (UE) device, also referred to as a user's mobile device, contacts a base station for access. As described above, generally a UE will attempt to contact the base station that it is in closest proximity to. Once the UE establishes contact with a base station at step 202, the process can move to step 204, wherein it can be determined if the base station is currently using barring to meter access to the device. Barring can refer to a mechanism that base stations can use to meter access to the core network during times of high congestion or emergency, wherein the amount of users simultaneously accessing a particular base station needs to be reduced so as to avoid or mitigate congestion on the network. In some examples, if barring is engaged, general UE devices can be made to wait to gain access to the network, while high-priority users (i.e., emergency services, utilities, etc.) can be granted priority access. If a user is subject to barring, then in one or more examples the user can be made to wait. In one or more examples, if barring is engaged, the UE can be instructed by the base station to generate a random number, and if the generated number is higher than a predetermined value, then the UE can be granted access.

Returning to the example of FIG. 2, at step 204, a check is made to determine if barring is engaged. If barring is engaged, the process can then move to step 206, wherein a determination is made as to whether the particular UE can bypass the barring (i.e., because the user is a priority user, such as emergency personnel, law enforcement, etc.) If at step 206 it is determined that the particular UE requesting access to the cellular network cannot bypass the barring, then the process can move to step 208, wherein the UE is made to wait (as described above) and then, once the waiting period has expired, can re-attempt to the contact the base station at step 202.

If, however, the UE is able to bypass the barring at step 206 or barring is determined to not be engaged at step 204, the process 200 can then move to step 210, wherein the UE device undergoes an authentication process. The transition between steps 204 or 206 to step 210 can represent the transition between actions performed at the base station and actions performed at the core network of the mobile communication network. Thus, once a UE either is barred and then later granted access or isn't subject to barring, the base station can pass on the UE device's message to the core network at step 210.

At step 210, the device can be authenticated to determine if the UE device is a valid UE device and includes the proper credentials for access to the network. Once the authentication process has been performed, the process can move to step 212, wherein a determination is made as to whether the device should be granted access to the network or not. If, at step 212, the device is determined to not be an authorized user, the process can move to step 214 wherein the UE is notified of the denial of service and can be instructed to take remedial actions such as changing its identification credentials. If, however, the UE is determined to be an authorized device, the process can move to step 216, wherein the UE device is given access to the core network.

The process described above with respect to FIG. 2 can be effective in ensuring that malicious users do not have access to the core of the mobile network; however, despite the authentication process, a malicious user can still exploit various vulnerabilities of the system to frustrate or even bring down the mobile network. This can be especially true given the fact that the majority of the authentication process can occur within the core of the network meaning that even if the UE device is malicious, it will still occupy some of the core network's bandwidth and computing resources so that the core network can authenticate it.

Figure 3:
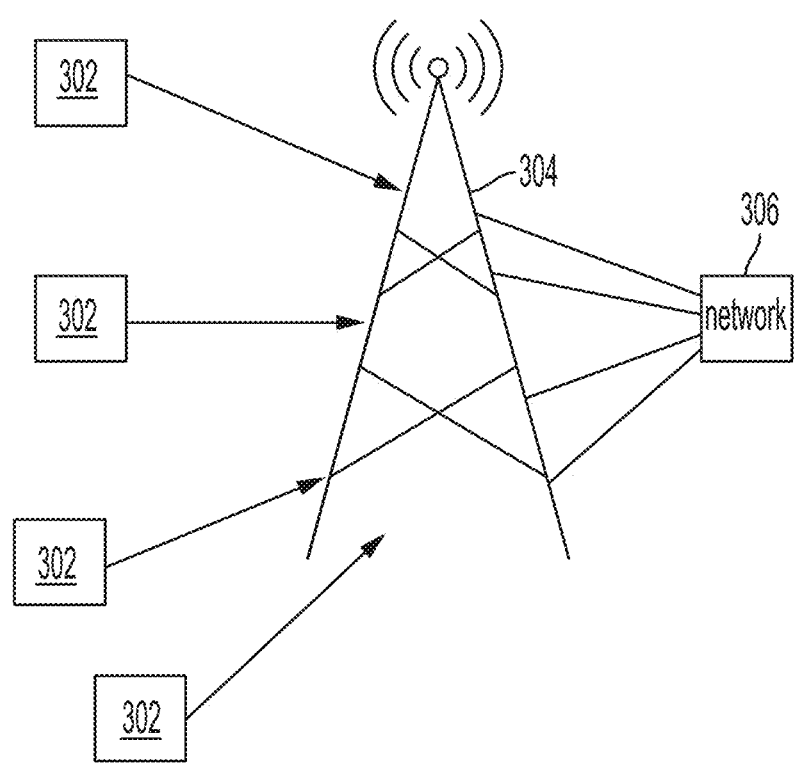
FIG. 3 illustrates an exemplary cellular network attack vector according to examples of the disclosure.

FIG. 3 illustrates an exemplary cellular network attack vector according to examples of the disclosure. In the example of FIG. 3, multiple malicious users 302 can attempt to contact a base station 304, with the ultimate goal of accessing the core network 306. As these users are not authorized users, they will ultimately be unable to access the core network 306. However, as outlined above with respect to FIG. 2, the malicious user 302 may be able to access the base station 304. The base station 304, after establishing contact with each malicious user 302, may pass on those communications to core network 306.

Upon receiving the transmissions from each of the malicious users 302, the base station 304, as discussed above with respect to FIG. 2, can relay those transmissions to the core network 306 for authentication. At core network 306, each of the malicious users can be authenticated as described above with respect to steps 210 and 212 of FIG. 2. Ultimately, because those seeking to authenticate their identities to the core network 306 are malicious users, the authentication can fail, and the malicious user therefore can be denied access to the core network 306.

Despite being denied access to the core network, the malicious users seeking access to the network can still interfere with the operations of the core network 306. Since the process of authenticating each malicious user can occur at the core network, the very act of authentication can occupy core network bandwidth and computing resources. Thus, if enough malicious users (or even a single malicious user) transmit enough simultaneous or near simultaneous authentication requests to the core network 306, the core network may have to expend a significant amount of bandwidth and computing resources to respond to those requests, so as to cause congestion on the core network. This congestion in turn can cause a slow-down in the flow of network traffic and can frustrate communications between legitimate users of the core network. This type of attack, in which malicious users seek to occupy network resources to the exclusion of legitimate users, can also be known as a denial of service attack.

Because the authentication process occurs at the core network 306, and because there can be a lack of a substantial security mechanism that keeps malicious users from accessing the core network, malicious users can hamper a core network's ability to function without being required to authenticate themselves to the network. This security vulnerability (i.e., attack vector) can stem from the fact that the base station simply relays communications to the core network, and may not do anything to substantially curtail a malicious user's ability to contact the core network.

Figure 4:
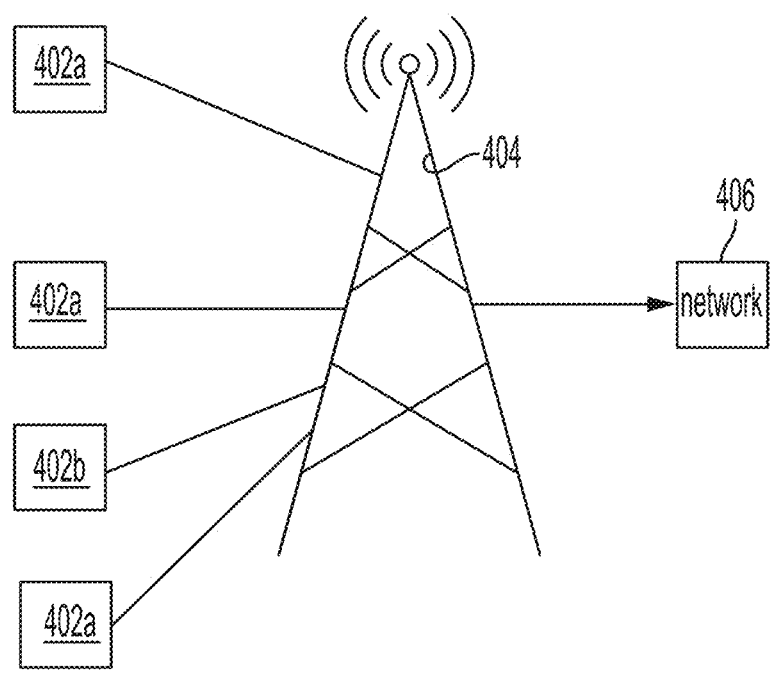
FIG. 4 illustrates another exemplary cellular network attack vector according to examples of the disclosure.

FIG. 4 illustrates another exemplary cellular network attack vector according to examples of the disclosure. In the example of FIG. 4, the base station 404 can authenticate a plurality of users at the base station itself, thereby only allowing authenticated users access to the core network 406. Thus, in an example where malicious user 402a and a legitimate user 402b are attempting to access a core network 406, only the legitimate user 402b can ultimately be granted access to the core network.

In one or more examples, despite being authenticated at the base station, a legitimate user 402b can undergo further authentication, as described above with respect to FIG. 2. Thus, while malicious users 402a may never access the core network 406 due to a failure to authenticate at the base station 404, a legitimate user can be granted access to the core network.

In one or more examples, despite being authenticated at the base station 404, a legitimate user may still need to be authenticated at the core network 406. This can be because the authentication protocols and procedures carried out at the base station 404 may not be as robust and comprehensive as the authentication procedures that are used by the core network 406.

The authentication procedures carried out at the base station may need to be robust enough to block unauthorized access to the core, however because a mobile user maybe moving, they may change base stations frequently, the authentication procedure should lead to efficient access at many base stations rather than only one. Requiring users to always authenticate at the base station each time they change geographic locations and thus access a new base station may be cumbersome and frustrate the mobile user's experience with accessing the mobile network. Thus, a security paradigm that is implemented at the base station, rather than the core, can require that once a user authenticates themselves with one base station, that authentication should be transmitted to each base station in the network, such that when the user accesses another base station, the new base station can easily recognize the mobile user as an authorized user and quickly (with minimal overhead) pass their messages on to the core network. Thus, an authentication system that works as the edge of the network (i.e., the base station) should require a robust authentication procedure when the mobile user makes first contact with the network via a base station, but when the mobile user changes base stations, the security procedure at the base station should not re-start the entire authentication process and should quickly recognize the user as authorized and pass their message to the core network.

Thus, when a mobile user authenticates at a first base station, that authentication can be transmitted to other base stations, such that when the user accesses a second or more base stations in the network, the user should not be required to engage in the authentication procedure from scratch.

A distributed ledger-based authentication system (sometimes known as blockchain) can provide a solution to the security needs described above. Blockchain can provide security and anonymity to UEs trying to gain access to the network as well as mitigate a number of attacks on a mobile network such as an LTE network. The blockchain can be held as a distributed ledger between base stations in a geographic region. In one or more examples, the base stations can be authorized as members of the blockchain from the core network (MME or HSS) and can process the majority of the transactions from mobile users. The blockchain framework can be used to provide an alternate method of authentication.

In one or more examples, the mobile user could try to access the mobile network using a standard radio resource control (RRC) request or could request access to a network using the blockchain method. During an attack on the registration process (such as a denial of service attack) the blockchain method can have the added benefit of blocking the messages before they reach the core network, providing more security to the core network.

Figure 5:
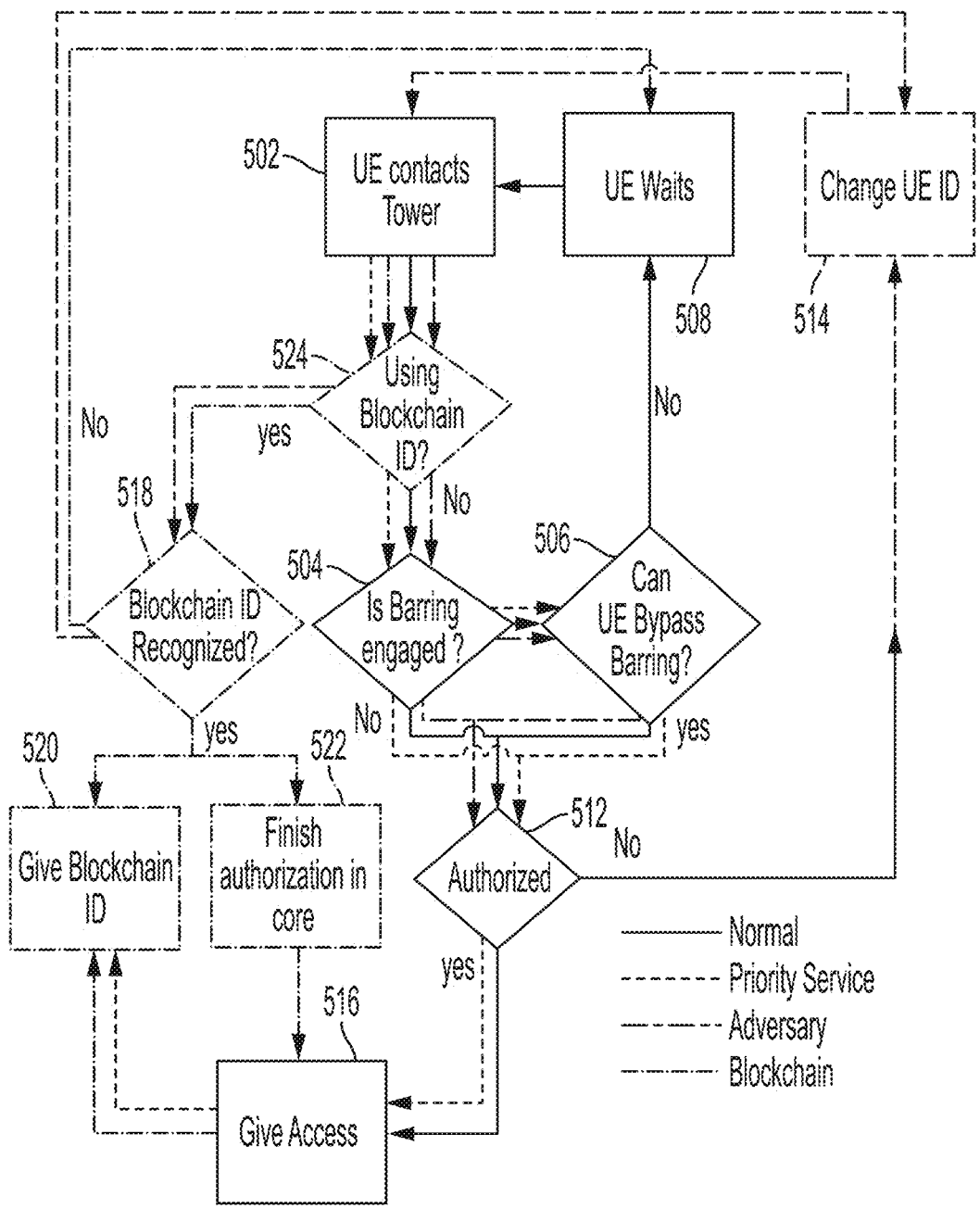
FIG. 5 illustrates an exemplary mobile communication authentication process using a distributed ledger system according to examples of the disclosure.

FIG. 5 illustrates an exemplary mobile communication authentication process using a distributed ledger system according to examples of the disclosure. The process 500 of FIG. 5 can be performed in substantially the same way as the process 200 of FIG. 2, with the primary difference being the addition of the distributed ledger authentication process performed at the edge of the network as discussed in detail below.

Thus, similar to FIG. 2, the process 500 can begin a step 502, wherein a UE device contacts a base station for access. In one or more examples, the base station can initiate the contact by sending a broadcast signal that is detected by the UE device, which in response to the signal, can establish a connection with the base station.

Once the UE establishes contact with a base station at step 502, the process can move to step 524, wherein the base station establishes whether the UE device is employing a blockchain identification number (ID). As will be described in further detail below, a blockchain ID can be a unique number or identifier to each UE device that identifies the UE device to the base station. If it is determined at step 524 that the UE device is not utilizing a blockchain ID to authenticate itself to the base station, the process can move to step 504, wherein it can be determined if the base station is currently using barring to meter access to the device. The barring process encompassed by steps 504, 506, and 508 can be substantially similar to their counterparts, steps 204, 206, and 208 of FIG. 2, and therefore the operation of steps 504, 506, and 508 can be referenced above with respect to the discussion of their counterparts described with respect to FIG. 2.

If, at step 524, the UE device is determined to be utilizing a blockchain ID, the process then can move to step 518, wherein the UE blockchain ID is verified by the base station as a recognized blockchain. In one or more examples, the process of verifying the blockchain ID can include checking the blockchain ID against a list of blockchains stored on a distributed ledger. In one or more examples, the distributed ledger can be stored not only at the base station that the UE device is attempting to access, but also at the other base stations that are part of the mobile network or some subset thereof.

In one or more examples of the disclosure, the blockchain ID can not only store a unique identification number corresponding to the UE device but can also store metadata associated with the UE device. In other words, rather than simply identifying which UE device is associated with the blockchain ID, the ID can also provide information regarding the UE device, such as the encryption capabilities of the UE device and/or the international mobile subscriber identity (IMSI) number. The above list is meant only for the purposes of providing examples, and other data associated with an UE device could also be stored with the blockchain ID associated with a particular UE device.

After the UE device is verified using the blockchain ID at the base station at step 518, the metadata associated with the blockchain ID can be used to facilitate a more efficient authentication process. For instance, in one or more examples, the encryption capabilities of a mobile device that can be stored as metadata associated with a particular blockchain ID can be used to streamline the authentication process. In conventional systems, each time a UE device accesses the network, it may have to provide its encryption capabilities to the network so as to inform the authentication process of the type of encryption it can handle during the authentication process. However, a UE device that utilizes a blockchain ID as described above may not be required to repeatedly provide its encryption capabilities to the base station. In one or more examples, during the verification process performed at the base station, once the UE device's blockchain ID is verified by the base station, the base station can retrieve the metadata associated with the UE device that can include the encryption capabilities of the UE device. The base station can then transmit this data to the core network rather than require that the UE device constantly transmit this information. This feature can thus reduce the amount of data that is required to be transmitted by the UE device to the base station, leading to efficient use of bandwidth and computing resources.

If, at step 518, the blockchain ID is recognized, the process can move to steps 520 and 522. At step 522, the base station, having recognized the blockchain ID at step 518, can transmit the information from the UE device to the core network so as to finish the authorization process in the core. As discussed above, the information transmitted from the UE device to the core network can include the information received from the UE device as well as any metadata associated with the blockchain ID that is being stored at the base station. That data can be provided to the core network at step 516, wherein the UE device is given access to the core network. If, at step 518 the blockchain ID is not recognized, in one or more examples the process can move to step 508, wherein the UE waits a pre-determined amount of time before trying to authenticate again. Or, in one or more examples, if the blockchain ID is not recognized at step 518, the process can move to step 514 wherein the UE ID can be modified or changed.

Also, in addition to finishing the authorization at the core at step 522, once the blockchain ID is recognized at step 518, the process can also move to step 520, wherein the UE device is issued a new blockchain ID that, in one or more examples, can match with a new blockchain ID that is kept at the base station and is maintained in the blockchain system. Issuing a new blockchain ID after every successful node authentication can provide added security to the mobile network by making it more difficult for malicious users to attempt to spoof a particular UE device's blockchain ID, thereby gaining authorized access to the mobile network. Since the amount of time that a blockchain ID is "active" is minimized, a malicious user will likely encounter difficulty in obtaining the blockchain ID and then using it to gain authorized access, since by the time the malicious user can use the blockchain ID to spoof a UE device, the UE device will have been issued a new blockchain ID by the network.

Referring back to step 524, if it is determined that the UE device is not using blockchain, and as discussed above, the UE device can undergo the authentication process outlined above with respect to FIG. 2 with respects to steps 204, 206, 208, 212, and 214 and as discussed with respect to steps 504, 506, 508, 512, and 514 of FIG. 5. At step 512, if the UE device is authorized to receive access to the core network at step 512, then the process can move to step 516, wherein the UE device is given access to the core network. After the access has been granted at step 516, the process can move to step 520, wherein the UE device, which previously had not been issued a blockchain ID, can be give a blockchain ID by the base station. In this way, the next time that the UE device attempts to access the network via an edge of the network (i.e., a base station), the UE device will have a blockchain ID that it can use to more efficiently gain access to the core network.

Using a blockchain approach to authorize UE devices at the base station (i.e., edge of the network) can allow for the blockchain ID to be distributed to other base stations in the network in a secure manner. Each base station in the network (or a subset thereof) can represent a node in the distributed ledger, and each node can independently verify and maintain the blockchain in a secure manner, thereby allowing for UE devices to transfer between base stations without requiring the UE device to receive new credentials to access the base station.

As will be discussed in detail below, by utilizing a distributed ledger system (i.e., blockchain) to distribute the blockchain IDs to each of the base stations, the system can take advantage of various secure features of distributed ledger technology to ensure that the authentication of UE devices at the base stations is secure and the vulnerability of base stations to attacks from malicious users is minimized.

Figure 6:
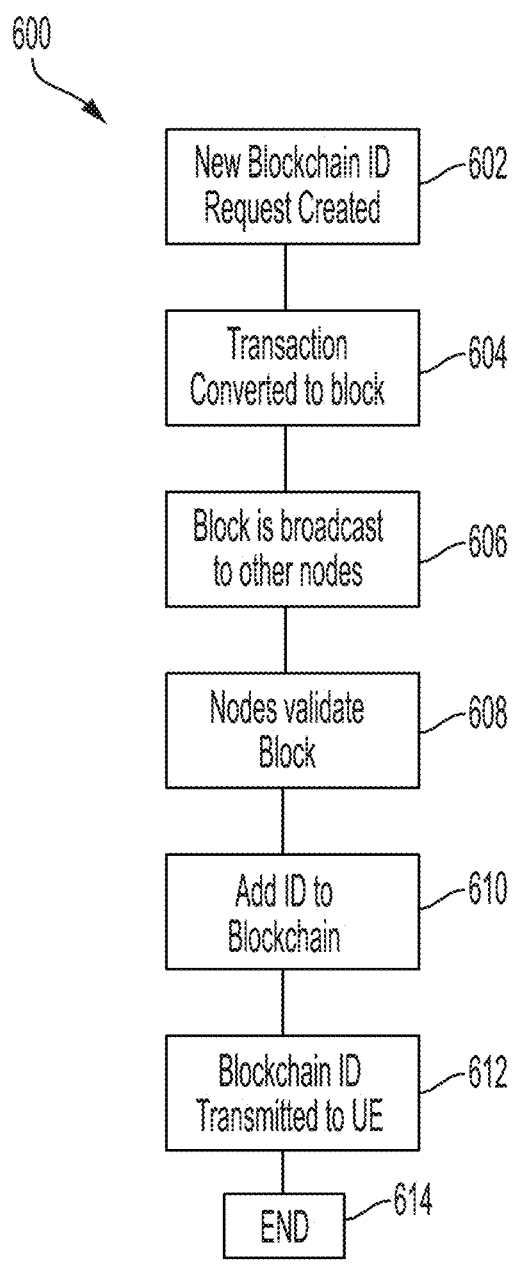
FIG. 6 illustrates an exemplary distributed ledger process according to examples of the disclosure.

FIG. 6 illustrates an exemplary distributed ledger process according to examples of the disclosure. The process 600 described with respect to FIG. 6 can be implemented at a mobile network base station and can be used to authenticate a UE device at the base station so as to provide access to the UE device to the core of the network by performing an authentication process at the base station.

The process 600 can correspond to the step 520 described with respect to FIG. 5. In other words, at step 520, in order to assign a UE device a blockchain ID, the base station can engage in the process 600 so as to provide the UE with an authentic blockchain ID. The process 600 can begin at step 602, wherein a new blockchain ID is requested/provided by a base station for a UE device that has accessed the base station. At step 602, the base station can generate a new blockchain ID and can associate any metadata associated with the UE device as described above. Once the new blockchain ID has been generated, the base station that is currently providing access to the UE device can begin the process of distributing the blockchain to other base stations in the mobile network via a distributed ledger system.

Thus, after generating the blockchain ID at step 602, the process can move to step 604, wherein the transaction (i.e., the association of the new blockchain ID to a UE device) can be converted to a block in the blockchain. Distributed ledger technologies can utilize blocks to build the ledger that store pertinent information (such as blockchain IDs and metadata). In one or more examples, a "block" can refer to a container data structure that holds one or more transactions. In the case of a blockchain ID, a block can refer to a data structure that holds a record of the transaction between a base station and a UE device, in which the base station associates a particular blockchain ID with a particular UE device and its associated metadata. In order to build the block, in one or more examples, the data associated with the transaction between the UE device and the base station can be converted into a string of numbers and letters known as a hash that can be produced by a hash function. In one or more examples a hash function can be a mathematical function that takes a variable number of characters (i.e., the blockchain ID and metadata associated with a UE device) and converts it into an alpha-numeric string with a fixed number of characters.

In order to add more security to the distributed ledger, the hash function can convert the transaction into an alpha-numeric string by not only converting the current transaction but also all of the previous transactions into a single alpha-numeric string. In other words, each transaction is recorded into an alpha-numeric string by converting the current transaction plus the previous alpha-numeric hash into a new alpha-numeric hash. In this way, each hash is not just dependent on the current transaction, but also all of the previous transactions. By performing the hash in this manner, the distributed ledger system can be more secure, as a malicious user seeking to gain unauthorized access to the distributed ledger and manipulate it would need to have knowledge of every prior transaction in the blockchain and not just the current pending transaction.

In one or more examples, once the transaction between the UE device and the base station (i.e., the assigning of the blockchain ID) is converted into a block using the hashing method described above, the process can move to step 605, wherein the newly created block is broadcast to other nodes. In one or more examples of the disclosure, each base station in the mobile network or a subset thereof can be configured to act as a node within the distributed ledger system described above. A "node" can refer to a computing resource that is independent of other nodes in the system, wherein the computing resource concurrently stores the ledger along with other nodes. Any change to the blockchain at one node can be transmitted to the other nodes at step 606 and, as described in further detail below can be verified by each node.

Once the new block has been broadcast to each node (i.e., base station) in the distributed ledger network at step 606, the process can move to step 608, wherein each node can independently verify the new block and determine whether the new block is authentic. The outcome of the verification at each node can be transmitted back to the node seeking to add the transaction to the distributed ledger, and if the base station seeking to add a transaction to the distributed ledger determines that a predetermined number of nodes have validated the new transaction, the process can move to step 610, wherein the new blockchain ID is added to the blockchain by the base station. In one or more examples, the predetermined number can be set so that a majority of the other nodes in the distributed ledger system have to validate a transaction, or in one or more examples the predetermined number can be set so as to require that all of the nodes in the distributed ledger system are required to validate the transaction in order for the new blockchain ID to be added to the list of blockchain IDs stored in the distributed ledger. By requiring that a certain number of nodes (which are independent of the base station seeking to add the blockchain ID) validate the transaction, the overall distributed ledger may be less vulnerable to manipulation by a malicious user.

Thus, at step 610, after receiving the requisite predetermined number of validations from other nodes in the distributed ledger system, the process 600 can add the newly created blockchain ID to the ledger of blockchain IDs and the ledger can also be updated at all of the various nodes within the distributed ledger system. Once the blockchain ID has been added to the ledger at step 610, the process 600 can move to step 612, wherein the newly created blockchain ID can be transmitted to the UE device for use in subsequent access requests to a base station of the mobile network. After the new blockchain ID is transmitted to the UE device at step 612, the process 600 can move to step 614, wherein the process is terminated.

As discussed above, the nodes of the blockchain can be maintained at one or more base stations. However, as base stations are small and do not contain a significant amount of space, the computing resources residing at the base station to implement the distributed ledger system may be constrained. In other words, the size of the blockchain may be constrained insofar as the computing device used to store the distributed ledger may only be able to record and store a finite number of transactions before there is no more memory storage available to hold subsequent transactions. Since a mobile network can include many users who are constantly accessing the network and thus may need new blockchain IDs at a high frequency, a blockchain could be maxed out very quickly at a given base station.

In light of the base station computing constraints, in one or more examples, the distributed ledger stored at the nodes of the distributed ledger system can be deleted after a predetermined amount of time. Since blockchain IDs and cell tower access can be occurring at a high frequency, after a predetermined amount of time the nodes of a distributed ledger system can delete the current blockchain and initialize a new blockchain. In one or more examples, the process of deleting and initializing a new blockchain can be carried out by the core network. The core network can contact each node in the distributed ledger system and instruct it to delete the current blockchain and then initialize the nodes to create a new blockchain.

As discussed above, the amount and size of computing resources that can be put in place at a base station to implement the distributed ledger system can be constrained. Also, as discussed above, this constraint can be managed by managing the amount of time in which a particular blockchain is allowed to exist before being deleted and a new blockchain being initialized. This can effectively ensure that the size (in terms of memory) of the blockchain may not exceed a certain amount. In one or more examples, another effective way of managing the memory space occupied by a blockchain is to constrain the number of nodes that are implementing the blockchain. As discussed above, each base station can act as a node in the blockchain. Since the base stations act as the initial access point for UE devices to a mobile network, the more nodes that are included in a particular implementation of a distributed ledger, the more blockchain IDs are likely to be included on the ledger, since each node is interacting with UE devices and creating blockchain IDs. Thus, another way to constrain the size of the blockchain, is to place a limit on the number of base stations used to create a single blockchain. In one or more examples, the base stations in a mobile network can be partitioned into one or more regions, and each region within the mobile network can initialize and maintain its own distributed ledger.

Referring back to FIG. 1, and as discussed above, the mobile network 100 can include multiple base stations 102. Due to computing resource constraints at the base stations 102, it may not be possible for a single distributed ledger to be maintained for every single base station in the mobile communications network 100. Thus, in one or more examples, various subsets of the base stations 102 can be partitioned and the base stations in a particular subset can be configured to implement a single blockchain that holds the blockchain IDs of the UE devices that are engaged with or have already engaged with a base station or multiple base stations within the subset.

In one or more examples, the base stations 102 of mobile network 100 can be divided into a plurality of sub-groups referred to as a "tracking area." As shown in FIG. 1, the mobile communications network 100 can include multiple tracking areas 108, and each tracking area 108 can include multiple base stations 102 of the mobile network 100. In one or more examples, a tracking area 108 can be mutually exclusive, meaning that no single tracking area includes base stations that are also part of another tracking area. In other examples, and as illustrated in FIG. 1, each tracking area 108 may include on or more base stations that are also part of another tracking area. In other words, tracking areas 108 can share base stations in common. As an example, a single tracking area 108 may include 25 base stations 102.

As discussed above, when a mobile device switches between different base stations (due to movement and changing proximity to a base station), the mobile device may not have to reengage in the node authentication process if the node from which the mobile device came from shares the same blockchain as the node that the mobile device is now connected to. Using the tracking area concept described above, in one or more examples, if the UE device transfers to another base station within the same tracking area, then, since that new base station will also have the blockchain ID of the UE device stored in the ledger it maintains at the base station, the UE device can efficiently connect to the new base station without having to obtain a new blockchain ID.

However, in an example where a UE device is transferring from a base station in one tracking area to a base station in another tracking area, because the two base stations are in different tracking areas and thus are operating off of different blockchains, the UE device may not be able to connect to the new base station using its currently assigned blockchain ID. In order to transfer from one tracking area to another tracking area without needing to change blockchain IDs, a specialized handover procedure may be required.

Figure 7:
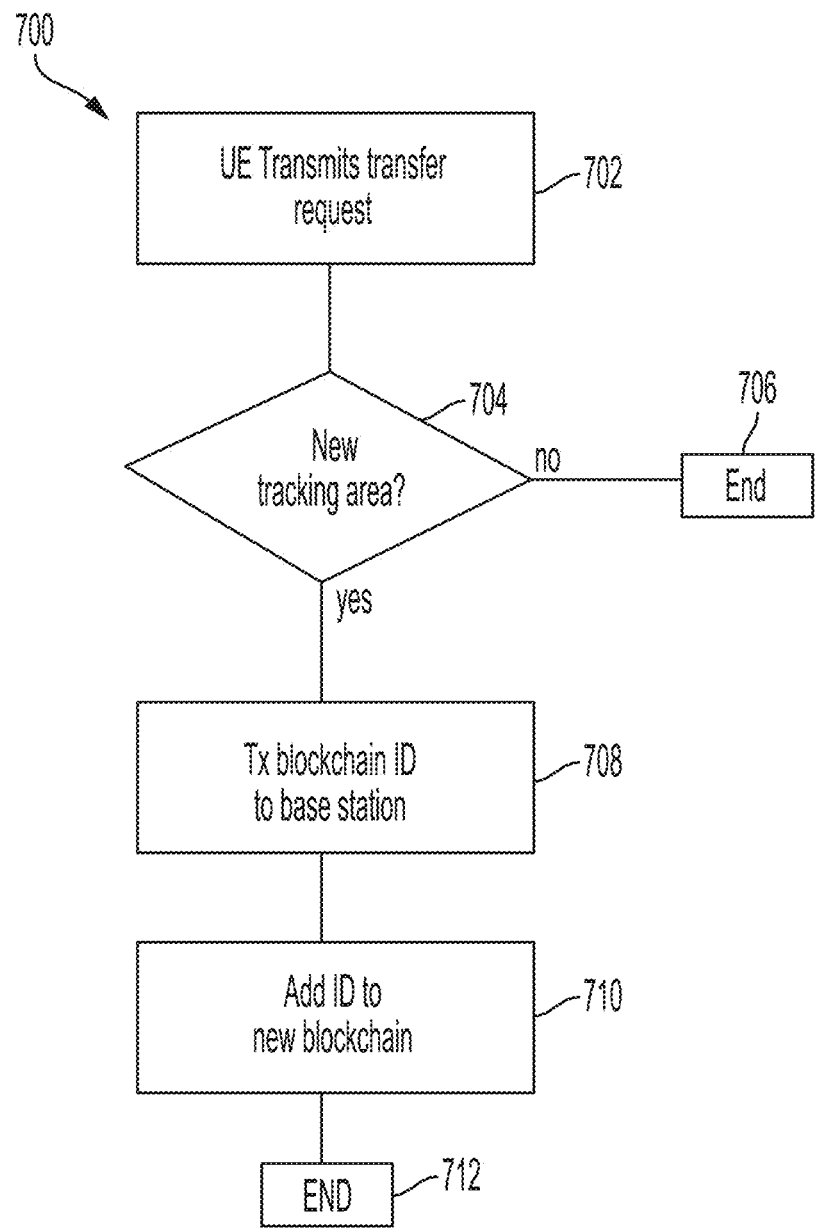
FIG. 7 illustrates an exemplary blockchain ID transfer process between tracking areas according to examples of the disclosure.

FIG. 7 illustrates an exemplary blockchain ID transfer process between tracking areas according to examples of the disclosure. In the example of FIG. 7, the process 700 can begin at step 702, wherein the UE device transmits a transfer request to the base station that it is currently connected to. In one or more examples, the UE device can determine when it is more geographically proximate to a base station other than the one it is currently connected to. If the UE device determines that it is more geographically proximate to another base station, the UE device can transmit a transfer request at step 702 indicating to the current base station it is connected to, that it wants to transfer and can also indicate which exact base station it wished to transfer to.

Once the base station receives the transfer request at step 702, the process can move to step 704, wherein the base station determines whether the transferee (i.e., new base station) is within the same tracking area or if it is located within a different tracking area. If the new base station is located in the same tracking area, then the new base station can be also part of the same blockchain as the current base station and thus the UE device's currently assigned blockchain ID can already be known to the new base station via the distributed ledger. Thus, at step 704, if the new base station is within the same tracking area, then the process can move to step 706, wherein the UE device is transferred to the new base station and the process 700 is terminated.

However, if, at step 704, it is determined that the new base station is in a different tracking area from the current base station, then the process can move to step 708 so as to initialize a special handover procedure that can effectively transfer the UE device's blockchain ID to the new base station for integration into that base station's blockchain. At step 708, the current base station can transmit the blockchain ID of the UE device to the new base station either via the core network, or by using a base station to base station communication network (for example an X2 network in LTE) so as to pass on the requisite information to the new base station that can allow for the UE device to efficiently connect to the new tracking area.

Once the blockchain ID has been received by the new base station, the process can move to step 710 wherein the newly received blockchain ID is added to the blockchain of the new tracking area. In one or more examples, adding the new blockchain ID to the tracking area's blockchain can be implemented using the process 600 discussed with respect to FIG. 6. Once the received blockchain ID is integrated into the tracking area's blockchain, every base station in the tracking area can now have access to that blockchain ID, and the UE device can now have access to the base stations within the tracking area using the blockchain ID assigned to it. Once the new blockchain ID is added to the new blockchain of the tracking area, the process can move to step 712 wherein the process is terminated.

Figure 8:
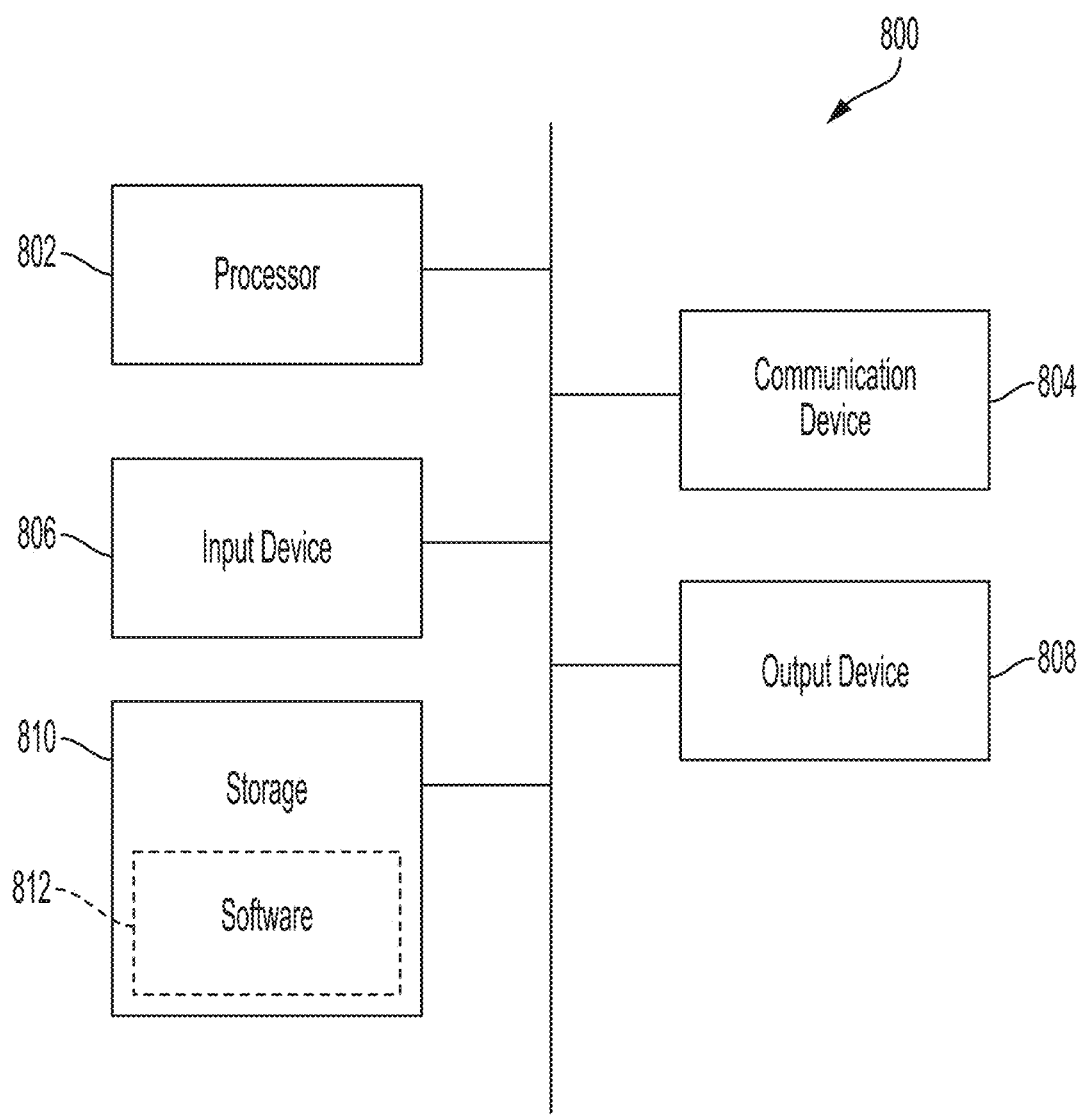
FIG. 8 illustrates an exemplary computer system according to examples of the disclosure.

An example of a computer system for implementing distributed ledger based authentication techniques at a mobile network base station are according to some embodiments illustrated by system 800 in FIG. 8. As shown in FIG. 8, system 800 can be any suitable type of microprocessor-based device, such as a personal computer, workstation, server, handheld computing device, such as a phone or tablet, or distributed computing system (e.g., cloud computing system). The system can include, for example, one or more of processor 802, communication device 804, input device 806, output device 808, storage 810, and/or software 812 stored on storage 810 and executable by processor 802. The components of the computer can be connected in any suitable manner, such as via one or more physical buses or wirelessly.

In some embodiments, system 800 may include server-side computing components as well as client-side computing components. The specific elements shown in FIG. 8 may, in some embodiments, be included in a server-side computer and/or may, in some embodiments, be included in a client-side computer. In some embodiments, system 800 may include server-side components and client-side components that are in communication with one another via one or more instances of communication device 804, which may, for example, enable communication of server-side components and client-side components over a network connection.

In some embodiments, some or all components of system 800 may be part of a distributed computing system (e.g., a cloud computing system). In some embodiments of the techniques disclosed herein, for example, storage 810 may be storage provisioned by a cloud computing system, such that a user may send instructions to the cloud computing system over one or more network connections, and the cloud computing system may execute the instructions in order to leverage the cloud computing components in accordance with the instructions. In some embodiments, cloud computing systems may be configured to be capable of executing the same or similar program code in the same programming languages as other systems (e.g., servers, personal computers, laptops, etc.) as discussed herein.

Processor 802 may be any suitable type of computer processor capable of communicating with the other components of system 800 in order to execute computer-readable instructions and to cause system 800 to carry out actions in accordance with the instructions. For example, processor 800 may access a computer program (e.g., software 812) that may be stored on storage 810 and execute the program to cause the system to perform various actions in accordance with the program. In some embodiments, a computer program or other instructions executed by processor 802 may be stored on any transitory or non-transitory computer-readable storage medium readable by processor 802.

Communication device 804 may include any suitable device capable of transmitting and receiving signals over a network, such as a network interface chip or card. System 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Input device 806 may be any suitable device that provides input, such as a touch screen or monitor, keyboard, mouse, button or key or other actuatable input mechanism, microphone, and/or voice-recognition device, gyroscope, camera, or IR sensor. Output device 808 may be any suitable device that provides output, such as a touchscreen, monitor, printer, disk drive, light, speaker, or haptic output device.

Storage 810 can be any suitable device that provides storage, such as an electrical, magnetic or optical memory including a RAM, cache, hard drive, CD-ROM drive, tape drive, or removable storage disk.

Software 812, which may be stored in storage 810 and executed by processor 802, may include, for example, the programming that embodies the functionality of the methods, techniques, and other aspects of the present disclosure (e.g., as embodied in the computers, servers, and devices as described above). In some embodiments, software 812 may include a combination of servers such as application servers and database servers.

Software 812 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 810, that can contain or store programming for use by or in connection with an instruction execution system, apparatus, or device.

Software 812 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

System 800 can implement any one or more operating systems suitable for operating on the network. Software 812 can be written in any one or more suitable programming languages, such as C, C++, Java, or Python. In various embodiments, application software embodying the functionality of the present disclosure can be deployed in different configurations, such as in a client/server arrangement or through a Web browser as a Web-based application or Web service, for example.

Although the description herein uses terms first, second, etc., to describe various elements, these elements should not be limited by the terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

According to some examples of the disclosure, the systems and methods can include a method for authenticating a mobile device at a mobile network base station, the method comprising: at a system comprising one or more processors and a memory located at the mobile network base station: storing a distributed ledger at the memory, wherein in the distributed ledger is maintained in conjunction with one or more other base stations, receiving a first access request at the base station from the mobile device, wherein the access request includes a first distributed ledger identification number, determining whether the first distributed ledger identification number is valid, if the first distributed ledger identification number is valid: transmitting the mobile device access request to a core network of the mobile network, generating a second distributed ledger identification number, associating the mobile device with the generated second distributed ledger identification number, converting the generated second distributed ledger identification number into a distributed ledger entry, transmitting the generated distributed ledger entry to one or more other base stations in the mobile network, and transmitting the generated second distributed ledger number to the mobile device. In one or more examples, converting the generated second distributed ledger identification number into a distributed ledger entry comprises: converting the generated second distributed ledger identification into a hash, wherein the hash is based on the generated second distributed ledger identification number and one or more previous transactions of the distributed ledger, transmitting the hash to the one or more base stations of the mobile network, receiving one or more validation signals from the one or more base stations, and adding the hash to the distributed ledger stored at the memory based on the one or more received validation signals. In one or more examples, converting the generated second distributed ledger identification into a hash includes converting data associated with the generated second distributed ledger identification number and the one or more previous transactions of the distributed ledger into an alpha-numeric string with a predetermined number of characters. In one or more examples, the one or more validation signals from the one or more base stations indicate whether the second distributed ledger identification number was successfully converted into an authenticated hash. In one or more examples, the mobile device access request is transmitted to the core network of the mobile network only if greater than a pre-determined number of the one or more base stations indicates that the second distributed ledger identification number was successfully converted into an authenticated hash. In one or more examples, storing the distributed ledger at the memory includes storing the distributed ledger for a predetermined amount of time and then deleting the distributed ledger after the predetermined period of time has expired. In one or more examples, if it is determined that the first distributed ledger identification number is not valid, the mobile device access request can be transferred to the core network to undergo authorization by the core network. In one or more examples, the base station and the one or more other base stations form a first tracking area, and wherein the method further comprises: receiving a request from the mobile device to transfer to another base station, determining if the base station to which the mobile device is requesting a transfer to, a base station that is associated with a second tracking area, and if it is determined that the base station to which the mobile device is requesting a transfer to is associated with the second tracking area: transmitting the second distributed ledger identification number to the base station associated the second tracking area.

According to some examples of the disclosure, the systems and methods include a non-transitory computer-readable storage medium storing one or more programs for authenticating a mobile device at a mobile network base station, the one or more programs configured to be executed by one or more processors communicatively coupled to one or more processors of a system, the one or more programs including instructions to cause the system to: store a distributed ledger at the memory, wherein in the distributed ledger is maintained in conjunction with one or more other base stations, receive a first access request at the base station from the mobile device, wherein the access request includes a first distributed ledger identification number, determine whether the first distributed ledger identification number is valid, if the first distributed ledger identification number is valid: transmit the mobile device access request to a core network of the mobile network, generate a second distributed ledger identification number, associate the mobile device with the generated second distributed ledger identification number, convert the generated second distributed ledger identification number into a distributed ledger entry, transmit the generated distributed ledger entry to one or more other base stations in the mobile network, and transmit the generated second distributed ledger number to the mobile device. In one or more examples, converting the generated second distributed ledger identification number into a distributed ledger entry comprises: converting the generated second distributed ledger identification into a hash, wherein the hash is based on the generated second distributed ledger identification number and one or more previous transactions of the distributed ledger, transmitting the hash to the one or more base stations of the mobile network, receiving one or more validation signals from the one or more base stations, and adding the hash to the distributed ledger stored at the memory based on the one or more received validation signals. In one or more examples, converting the generated second distributed ledger identification into a hash includes converting data associated with the generated second distributed ledger identification number and the one or more previous transactions of the distributed ledger into an alpha-numeric string with a predetermined number of characters. In one or more examples, the one or more validation signals from the one or more base stations indicate whether the second distributed ledger identification number was successfully converted into an authenticated hash. In one or more examples, the mobile device access request is transmitted to the core network of the mobile network only if greater than a pre-determined number of the one or more base stations indicates that the second distributed ledger identification number was successfully converted into an authenticated hash. In one or more examples, storing the distributed ledger at the memory includes storing the distributed ledger for a predetermined amount of time and then deleting the distributed ledger after the predetermined period of time has expired. In one or more examples, if it is determined that the first distributed ledger identification number is not valid, the mobile device access request can be transferred to the core network to undergo authorization by the core network. In one or more examples, the base station and the one or more other base stations form a first tracking area, and wherein the method further comprises: receiving a request from the mobile device to transfer to another base station, determining if the base station to which the mobile device is requesting a transfer to, a base station that is associated with a second tracking area, and if it is determined that the base station to which the mobile device is requesting a transfer to is associated with the second tracking area: transmitting the second distributed ledger identification number to the base station associated the second tracking area.

According to some examples of the disclosure, the systems and methods include a system for authenticating a mobile device at a mobile network base station, the system comprising one or more processors and a memory, wherein the one or more processors are configured to execute instructions stored on the memory to cause the system to: store a distributed ledger at the memory, wherein in the distributed ledger is maintained in conjunction with one or more other base stations, receive a first access request at the base station from the mobile device, wherein the access request includes a first distributed ledger identification number, determine whether the first distributed ledger identification number is valid, if the first distributed ledger identification number is valid: transmit the mobile device access request to a core network of the mobile network, generate a second distributed ledger identification number, associate the mobile device with the generated second distributed ledger identification number, convert the generated second distributed ledger identification number into a distributed ledger entry, transmit the generated distributed ledger entry to one or more other base stations in the mobile network, and transmit the generated second distributed ledger number to the mobile device.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

The invention claimed is:

1. A method for authenticating a mobile device at a mobile network base station, the method comprising:
at a system comprising one or more processors and a memory located at the mobile network base station:
storing a distributed ledger at the memory, wherein the distributed ledger is maintained in conjunction with one or more other base stations;
receiving a first access request at the base station from the mobile device;
generating a distributed ledger identification number;
associating the mobile device with the generated distributed ledger identification number;
converting the generated distributed ledger identification number into a distributed ledger entry;
transmitting the generated distributed ledger entry to one or more other base stations in the mobile network; and
transmitting the generated distributed ledger number to the mobile device.

2. The method of claim 1, wherein converting the generated distributed ledger identification number into a distributed ledger entry comprises:
converting the generated distributed ledger identification into a hash, wherein the hash is based on the generated distributed ledger identification number and one or more previous transactions of the distributed ledger;
transmitting the hash to the one or more base stations of the mobile network;
receiving one or more validation signals from the one or more base stations; and
adding the hash to the distributed ledger stored at the memory based on the one or more received validation signals.

3. The method of claim 2, wherein converting the generated distributed ledger identification into a hash includes converting data associated with the generated distributed ledger identification number and the one or more previous transactions of the distributed ledger into an alpha-numeric string with a predetermined number of characters.

4. The method of claim 2, wherein the one or more validation signals from the one or more base stations indicate whether the generated distributed ledger identification number was successfully converted into an authenticated hash.

5. The method of claim 4, wherein the mobile device access request is transmitted to a core network of the mobile network only if greater than a pre-determined number of the one or more base stations indicates that the generated distributed ledger identification number was successfully converted into an authenticated hash.

6. The method of claim 1, wherein storing the distributed ledger at the memory includes storing the distributed ledger for a predetermined amount of time and then deleting the distributed ledger after the predetermined period of time has expired.

7. The method of claim 1, wherein the mobile device access request is transferred to a core network to undergo authorization by the core network.

8. The method of claim 1, wherein the base station and the one or more other base stations form a first tracking area, and wherein the method further comprises:
receiving a request from the mobile device to transfer to another base station;
determining if the base station to which the mobile device is requesting a transfer to is associated with a second tracking area; and
if it is determined that the base station to which the mobile device is requesting a transfer to is associated with the second tracking area:
transmitting the generated distributed ledger identification number to the base station associated with the second tracking area.

9. A non-transitory computer-readable storage medium storing one or more programs for authenticating a mobile device at a mobile network base station, the one or more programs configured to be executed by one or more processors communicatively coupled to one or more processors of a system, the one or more programs including instructions to cause the system to:

store a distributed ledger at the memory, wherein the distributed ledger is maintained in conjunction with one or more other base stations;
receive a first access request at the base station from the mobile device;
generate a distributed ledger identification number;
associate the mobile device with the generated distributed ledger identification number;
convert the generated distributed ledger identification number into a distributed ledger entry;
transmit the generated distributed ledger entry to one or more other base stations in the mobile network; and
transmit the generated distributed ledger number to the mobile device.

10. The non-transitory computer-readable storage medium of claim 9, wherein converting the generated distributed ledger identification number into a distributed ledger entry comprises:
converting the generated distributed ledger identification into a hash, wherein the hash is based on the generated distributed ledger identification number and one or more previous transactions of the distributed ledger;
transmitting the hash to the one or more base stations of the mobile network;
receiving one or more validation signals from the one or more base stations; and
adding the hash to the distributed ledger stored at the memory based on the one or more received validation signals.

11. The non-transitory computer-readable storage medium of claim 10, wherein converting the generated distributed ledger identification into a hash includes converting data associated with the generated distributed ledger identification number and the one or more previous transactions of the distributed ledger into an alpha-numeric string with a predetermined number of characters.

12. The non-transitory computer-readable storage medium of claim 10, wherein the one or more validation signals from the one or more base stations indicate whether the generated distributed ledger identification number was successfully converted into an authenticated hash.

13. The non-transitory computer-readable storage medium of claim 12, wherein the mobile device access request is transmitted to a core network of the mobile network only if greater than a pre-determined number of the one or more base stations indicates that the generated distributed ledger identification number was successfully converted into an authenticated hash.

14. The non-transitory computer-readable storage medium of claim 9, wherein storing the distributed ledger at the memory includes storing the distributed ledger for a predetermined amount of time and then deleting the distributed ledger after the predetermined period of time has expired.

15. The non-transitory computer-readable storage medium of claim 9, wherein the mobile device access request is transferred to a core network to undergo authorization by the core network.

16. The non-transitory computer-readable storage medium of claim 9, wherein the base station and the one or more other base stations form a first tracking area, and wherein the system is further caused to:
receive a request from the mobile device to transfer to another base station;
determine if the base station to which the mobile device is requesting a transfer to is associated with a second tracking area; and if it is determined that the base station to which the mobile device is requesting a transfer to is associated with the second tracking area:
transmit the generated distributed ledger identification number to the base station associated with the second tracking area.

17. A system for authenticating a mobile device at a mobile network base station, the system comprising one or more processors and a memory, wherein the one or more processors are configured to execute instructions stored on the memory to cause the system to:
store a distributed ledger at the memory, wherein the distributed ledger is maintained in conjunction with one or more other base stations;
receive a first access request at the base station from the mobile device;
generate a distributed ledger identification number;
associate the mobile device with the generated distributed ledger identification number;
convert the generated distributed ledger identification number into a distributed ledger entry;
transmit the generated distributed ledger entry to one or more other base stations in the mobile network; and
transmit the generated distributed ledger number to the mobile device.

18. The system of claim 17, wherein converting the generated distributed ledger identification number into a distributed ledger entry comprises:
converting the generated distributed ledger identification into a hash, wherein the hash is based on the generated distributed ledger identification number and one or more previous transactions of the distributed ledger;
transmitting the hash to the one or more base stations of the mobile network;
receiving one or more validation signals from the one or more base stations; and
adding the hash to the distributed ledger stored at the memory based on the one or more received validation signals.

19. The system of claim 18, wherein converting the generated distributed ledger identification into a hash includes converting data associated with the generated distributed ledger identification number and the one or more previous transactions of the distributed ledger into an alpha-numeric string with a predetermined number of characters.

20. The system of claim 18, wherein the one or more validation signals from the one or more base stations indicate whether the generated distributed ledger identification number was successfully converted into an authenticated hash.

21. The system of claim 20, wherein the mobile device access request is transmitted to a core network of the mobile network only if greater than a pre-determined number of the one or more base stations indicates that the generated distributed ledger identification number was successfully converted into an authenticated hash.

22. The system of claim 17, wherein storing the distributed ledger at the memory includes storing the distributed ledger for a predetermined amount of time and then deleting the distributed ledger after the predetermined period of time has expired.

23. The system of claim 17, wherein the mobile device access request is transferred to a core network to undergo authorization by the core network.

24. The system of claim 17, wherein the base station and the one or more other base stations form a first tracking area, and wherein the system is further caused to:

receive a request from the mobile device to transfer to another base station;
determine if the base station to which the mobile device is requesting a transfer to is associated with a second tracking area; and
if it is determined that the base station to which the mobile device is requesting a transfer to is associated with the second tracking area:
transmit the generated distributed ledger identification number to the base station associated with the second tracking area.

\* \* \* \* \*